US008407586B2

(12) United States Patent
Niwa

(10) Patent No.: US 8,407,586 B2
(45) Date of Patent: Mar. 26, 2013

(54) EDITING APPARATUS, EDITING METHOD, AND PROGRAM

(75) Inventor: Nobuyuki Niwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/933,938

(22) Filed: Nov. 1, 2007

(65) Prior Publication Data

US 2008/0141122 A1 Jun. 12, 2008

(30) Foreign Application Priority Data

Dec. 7, 2006 (JP) ................................. 2006-330690

(51) Int. Cl.
*G06F 17/00* (2006.01)
(52) U.S. Cl. ......... 715/255; 715/271; 715/273; 715/277
(58) Field of Classification Search .................. 715/200, 715/201, 243–246, 253, 255–256, 763–765, 715/770, 804–805, 810–811, 271, 273, 277
See application file for complete search history.

(56) References Cited

U.S. PATENT DOCUMENTS

| 5,845,299 | A * | 12/1998 | Arora et al. .................... 715/209 |
| 8,031,171 | B2 * | 10/2011 | Kashito et al. ................ 345/156 |
| 8,320,740 | B2 * | 11/2012 | Tanaka et al. ................. 386/248 |
| 2003/0225758 | A1 * | 12/2003 | Yamasaki ........................ 707/3 |
| 2004/0215719 | A1 * | 10/2004 | Altshuler ...................... 709/204 |
| 2006/0155732 | A1 * | 7/2006 | Momose et al. .............. 707/101 |
| 2007/0140646 | A1 * | 6/2007 | Sakano ............................ 386/52 |
| 2007/0206920 | A1 * | 9/2007 | Hirose et al. .................... 386/95 |
| 2007/0276795 | A1 * | 11/2007 | Poulsen ............................ 707/2 |

FOREIGN PATENT DOCUMENTS

| JP | 05-250453 A | 9/1993 |
| JP | 2002-091949 A | 3/2002 |
| JP | 2002366473 A | 12/2002 |
| JP | 2006140769 A | 6/2006 |

OTHER PUBLICATIONS

Bott et al, 'Special Edition Using® Microsoft® Office 2003', QUE, Sep. 2003, pp. 128-133.*
Kazunori Ukikawa, Heartiness, All About Hanako 2005, Feb. 10, 2005, p. 153, First Edition, JUSTSYSTEM Corp., Japan.
Kazunori Ukikawa and Hiroshi Takahashi, All About Hanako 9, Nov. 20, 1998, p. 211, First Edition, JUSTSYSTEM Corp., Japan.
Takazi Nishide, Notification of Reason for Refusal for Patent Application No. 2006-330690, Japan Patent Office Communication per Patent Law Section 29(2), Jul. 12, 2011, Japan Patent Office, Japan.

* cited by examiner

*Primary Examiner* — Chau Nguyen
(74) *Attorney, Agent, or Firm* — Canon USA, Inc., IP Division

(57) ABSTRACT

An apparatus includes an editing area display unit configured to display a screen including an editing area that enables a user to edit a document, a temporary storage area display unit configured to display a temporary storage area which differs from the editing area and temporarily displays a list of reduced images of editing materials, and a layout editing unit configured to edit the document by adding a material selected from the editing materials displayed in the temporary storage area. When a currently edited document is transferred to a file, a control unit stores a path of a material displayed in the temporary storage area in relation to the document transferred to the file. When a document file stored in relation to the path of a material area is newly opened, the control unit determines whether the newly opened document file is related to the material in the temporary storage area.

6 Claims, 15 Drawing Sheets

EDITING APPARATUS, EDITING METHOD, AND PROGRAM

BACKGROUND OF THE INVENTION

1. Field of the Invention

The present invention relates to a layout editing apparatus used to edit a layout of images and characters disposed on a page of a document and store a generated page design into a file.

2. Description of the Related Art

As discussed in Japanese Patent Application Laid-Open No. 05-250453, a conventional layout editing apparatus can display a group of stock materials including images required for editing a document, such as reduced images belonging to the same category, in an area or a window different from an editing area. The layout editing apparatus enables a user to select one or plural materials and additionally displays each selected material in the editing area.

A conventional layout editing method includes collecting some stock materials as candidates to be used in a document editing operation, temporarily storing (displaying) the collected materials in another area or a window to enable a user to designate one or plural materials, and adding the designated material(s) into an editing area of a document.

Another conventional layout editing apparatus can display a toolbox of document editing functions in a separate window and enable a user to move the document editing toolbox window to an arbitrary place on a screen when a user performs an editing operation.

Furthermore, another conventional layout editing apparatus memorizes the position of a toolbox window when a user closes application software and, when the application is subsequently opened, automatically displays the toolbox window at a previous position.

However, according to the above-described conventional layout editing apparatuses, the material group information and the toolbox window information are displayed in independent areas different from an editing area of a document and may be simultaneously lost immediately after the application software is closed.

Although these information data may be memorized in relation to the application, the required material group and the window position are basically dependent on each document. If an editing apparatus is configured to uniformly memorize the material group and the window position depending on the used application, a user is required to re-select a material group and move the window position for each document.

SUMMARY OF THE INVENTION

Exemplary embodiments of the present invention are directed to an apparatus, a method, or a program, which is capable of restoring or reconstructing a previous state of a list of materials when the same document is subsequently opened, so that an optimum list of materials for an editing operation can be displayed and held for each document.

Furthermore, the exemplary embodiments of the present invention are directed to an apparatus, a method, or a program, which is capable of automatically adjusting a display position of a sub-window to a memorized previous position when the same document is next opened on a screen. Thus, a display of the sub-window is realized at a position optimized for each document. The operability is continuously kept for each user.

According to an aspect of the present invention, an apparatus includes an editing area display unit configured to display a screen including an editing area that enables a user to edit a document; a temporary storage area display unit configured to display a temporary storage area which differs from the editing area and temporarily displays a list of reduced images of editing materials; and a layout editing unit configured to edit the document by adding a material selected from the editing materials displayed in the temporary storage area. When a currently edited document is transferred to a file, a control unit stores a path of a material displayed in the temporary storage area in relation to the document transferred to the file. When a document file stored in relation to the path of a material in the temporary storage area is newly opened, the control unit determines whether the newly opened document file is related to the material in the temporary storage area. The control unit displays the document in the editing area according to a related state of the material in the temporary storage area and displays a list of reduced images of related materials in the temporary storage area.

According to another aspect of the present invention, an apparatus includes an editing area display unit configured to display a screen including an editing area that enables a user to edit a document; a sub-window display unit configured to change a display position of a sub-window on the screen according to a user's operation, wherein the sub-window displays materials used for editing a document or enables a user to input an instruction; and a control unit configured to memorize a display position of the sub-window on the screen in relation to the document when the document is stored and adjust a display position of the sub-window to the memorized position on the screen when a document having a related display position is opened on the screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
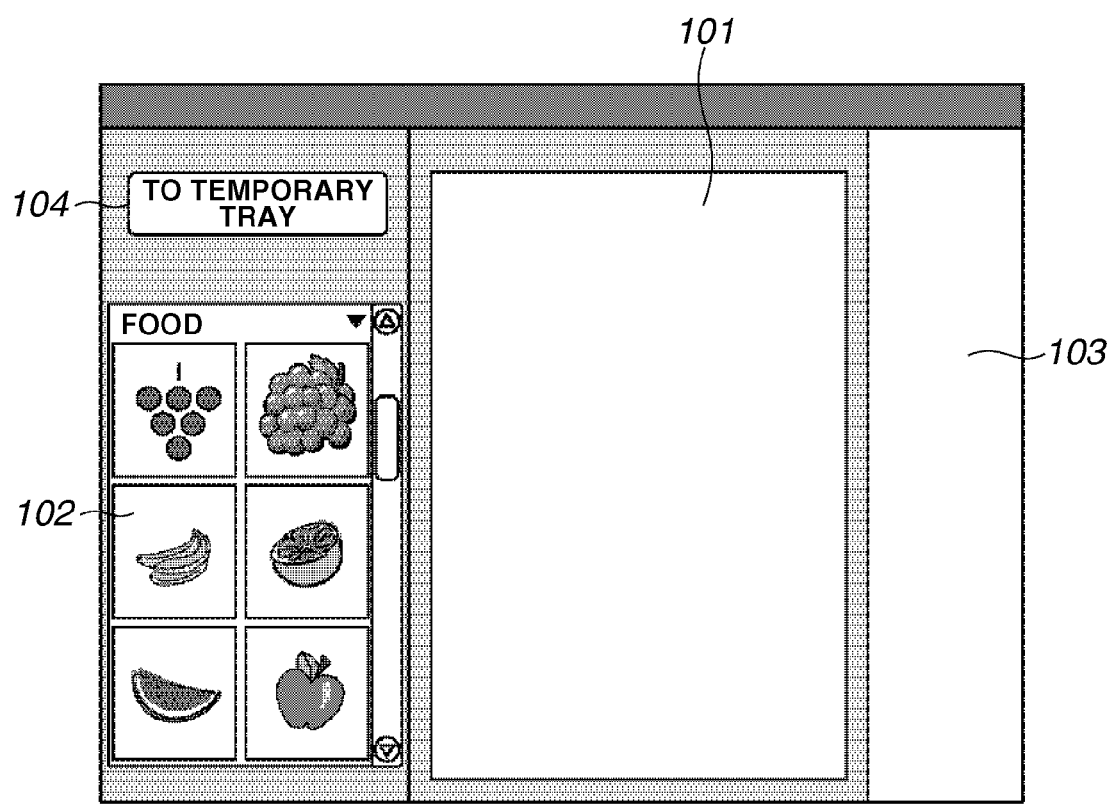
FIG. 1 illustrates an editing screen of application software according to a first exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates an editing screen of application software according to a first exemplary embodiment of the present invention. The editing screen includes a display area 101 that displays a document being currently edited, a display area 102 that displays a list of materials, a display area 103 that temporarily stores editing materials, a registration button 104 that enables a user to register editing materials into the temporary storage display area 103.

In FIG. 1, when a user presses the registration button 104 in a state where one material image is selected from the list of materials displayed in the display area 102, the temporary storage display area 103 displays the selected material image.

Figure 2:
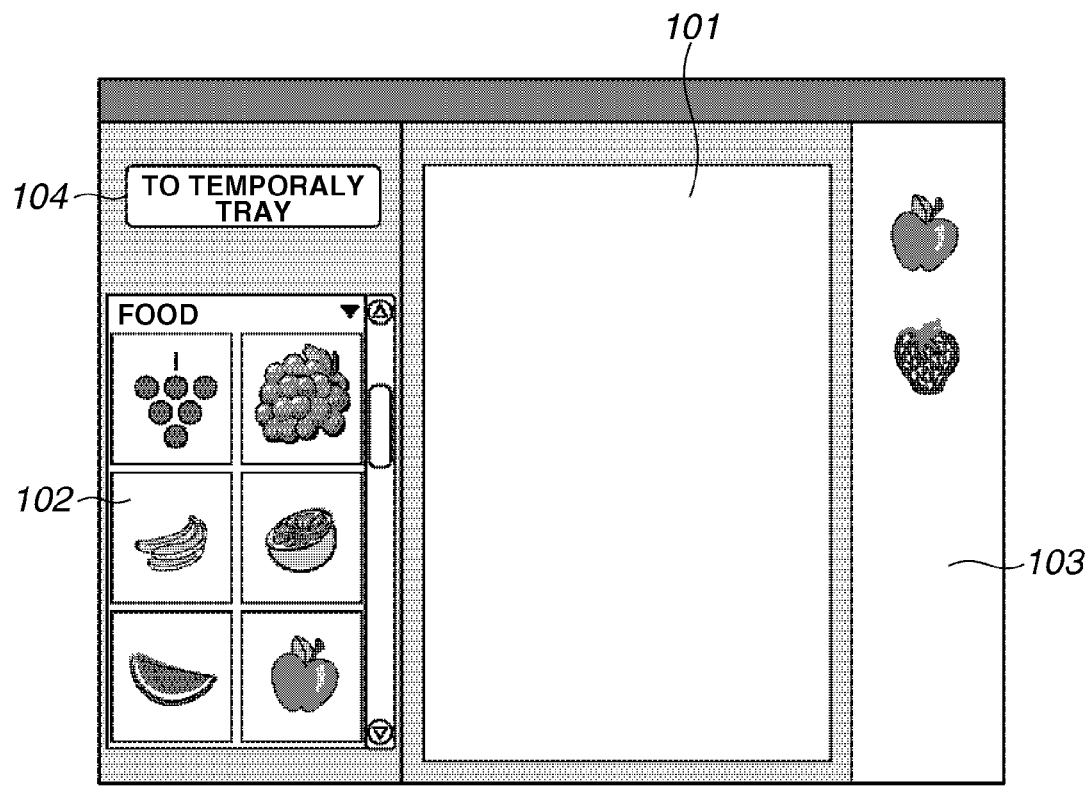
FIG. 2 illustrates an exemplary state of the editing screen that displays material images in a temporary storage display area.

FIG. 2 illustrates an exemplary state of the editing screen that displays material images in the temporary storage display area 103.

Figure 3:
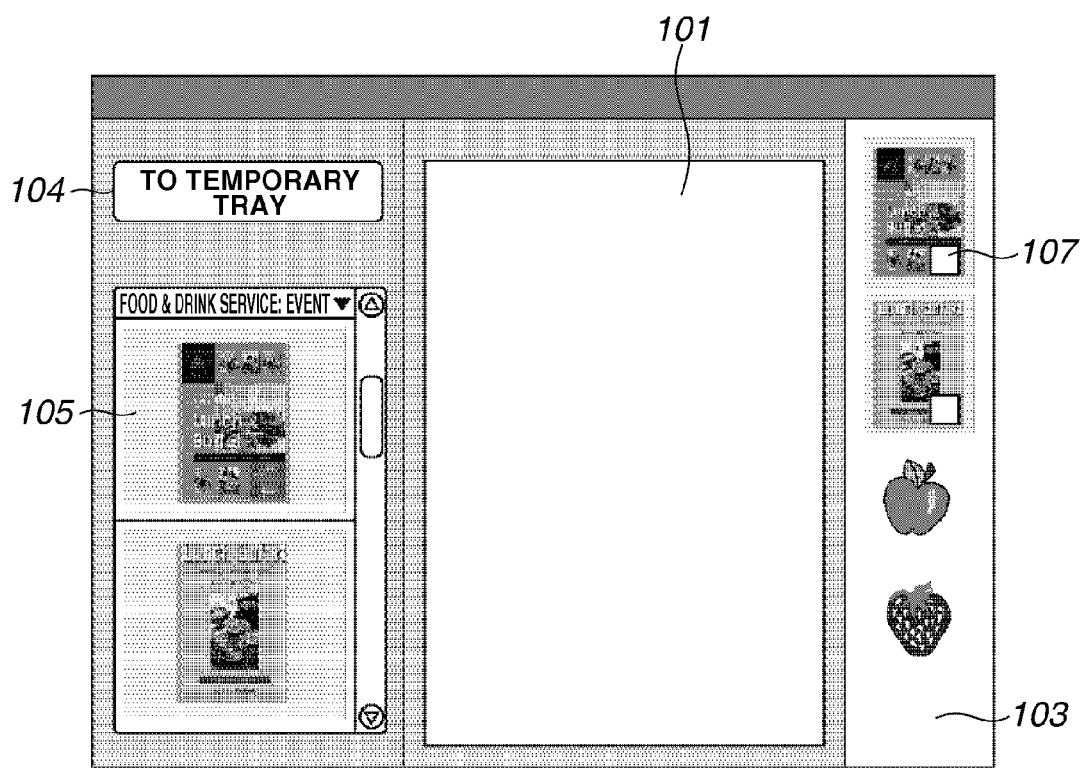
FIG. 3 illustrates an exemplary state of the editing screen that displays a list of templates (i.e., document samples) registered in the temporary storage display area.

FIG. 3 illustrates an exemplary state of the editing screen that displays a list of templates (i.e., document samples) registered in the temporary storage display area 103. The editing screen illustrated in FIG. 3 includes a display area 105 that displays a list of templates and the temporary storage area 103 that displays a mark 107 discriminating a template from materials.

In FIG. 3, when a user selects one template image from the list of plural templates displayed in the display area 105 and presses the registration button 104, the temporary storage display area 103 displays the selected template.

The mark 107 put on a reduced image of the registered template enables a user (i.e., a viewer) to discriminate the registered template from material images in the temporary storage display area 103.

Exemplary processing for transferring a currently edited document from a memory to a file is described below.

Figure 4:
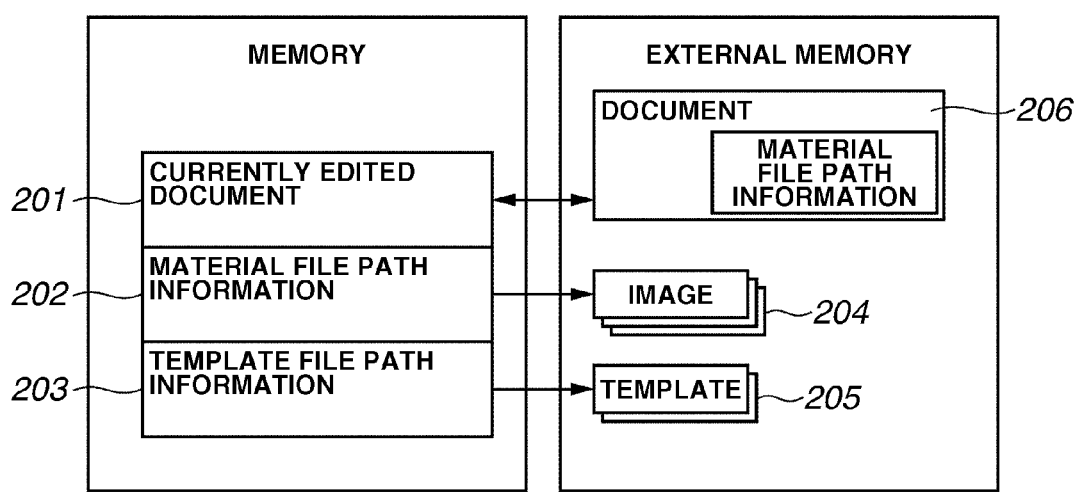
FIG. 4 illustrates an exemplary state of a memory that stores a document being currently edited, a temporary storage area, and its information.

FIG. 4 illustrates an exemplary state of a memory that stores a document being currently edited, a temporary storage area, and its information. The memory includes a storage area 201 of a document being currently edited, a storage area 202 of path information identifying a file that temporarily stores materials, and a storage area 203 of path information identifying a file that temporarily stores templates. An external memory includes a material image file group 204 identified by the path information described in the storage area 202, a template file group 205 identified by the path information described in the storage area 203, and a file 206 that can store an edited document.

The material file path information in the storage area 202 is information required to access the material image file group 204 registered for the purpose of temporary storage. The template file path information in the storage area 203 is information required to access the template file group 205 registered for the purpose of temporary storage.

When a document being currently edited in the storage area 201 is transferred to the file 206, the material file path information in the storage area 202 is written into the file 206 in addition to document data.

Next, when a document "A" is stored beforehand in a file, an exemplary operation for opening the document "A" file in an editing operation of a document "B" can be performed as described below with reference to FIGS. 5 to 8.

Figure 5:
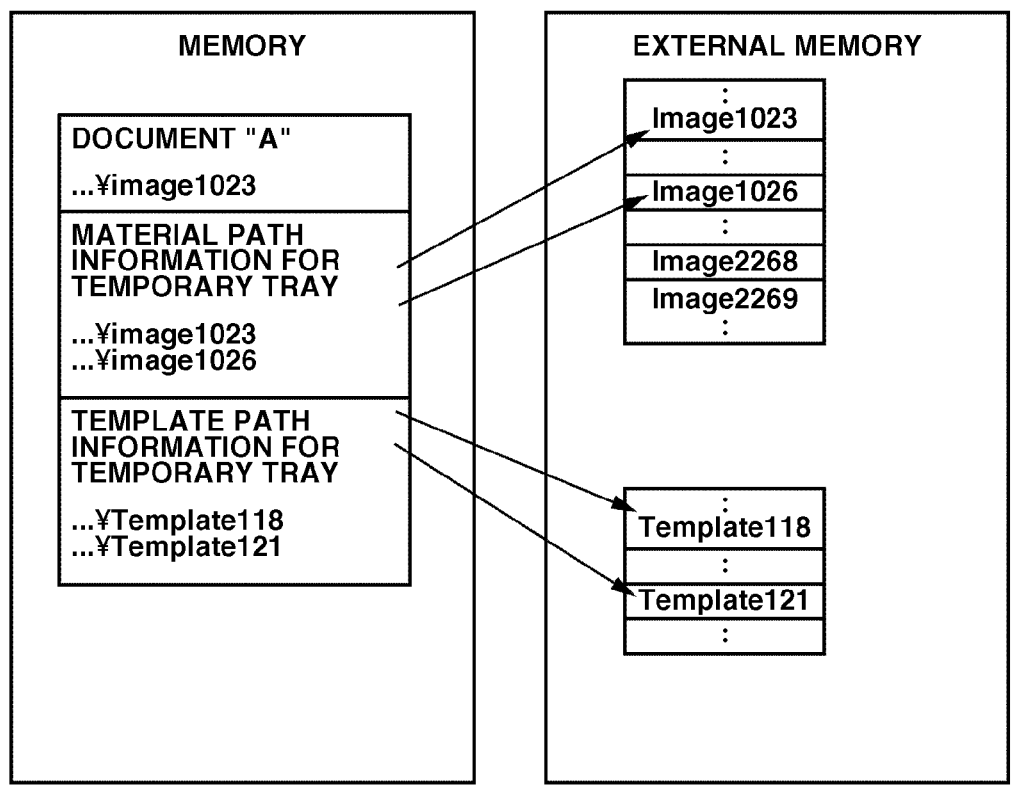
FIG. 5 illustrates an exemplary state of the memory in an editing operation of a document "A."
Figure 6:
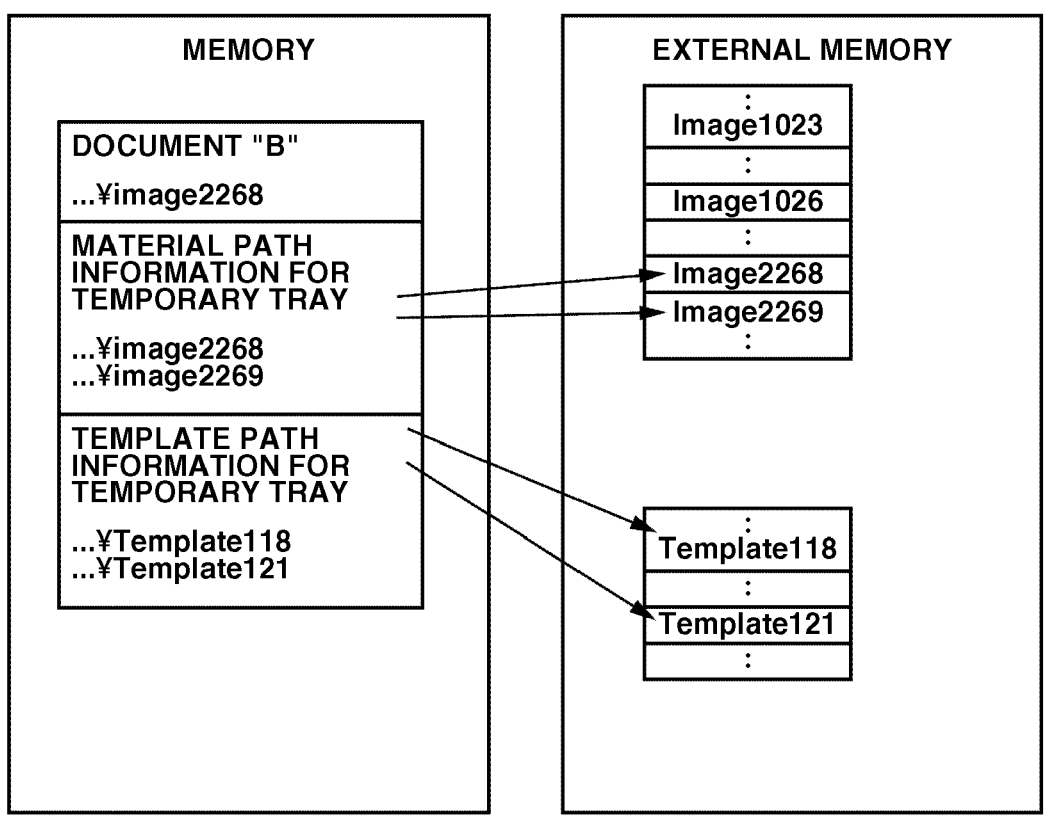
FIG. 6 illustrates an exemplary state of the memory in an editing operation of a document "B."
Figure 7:
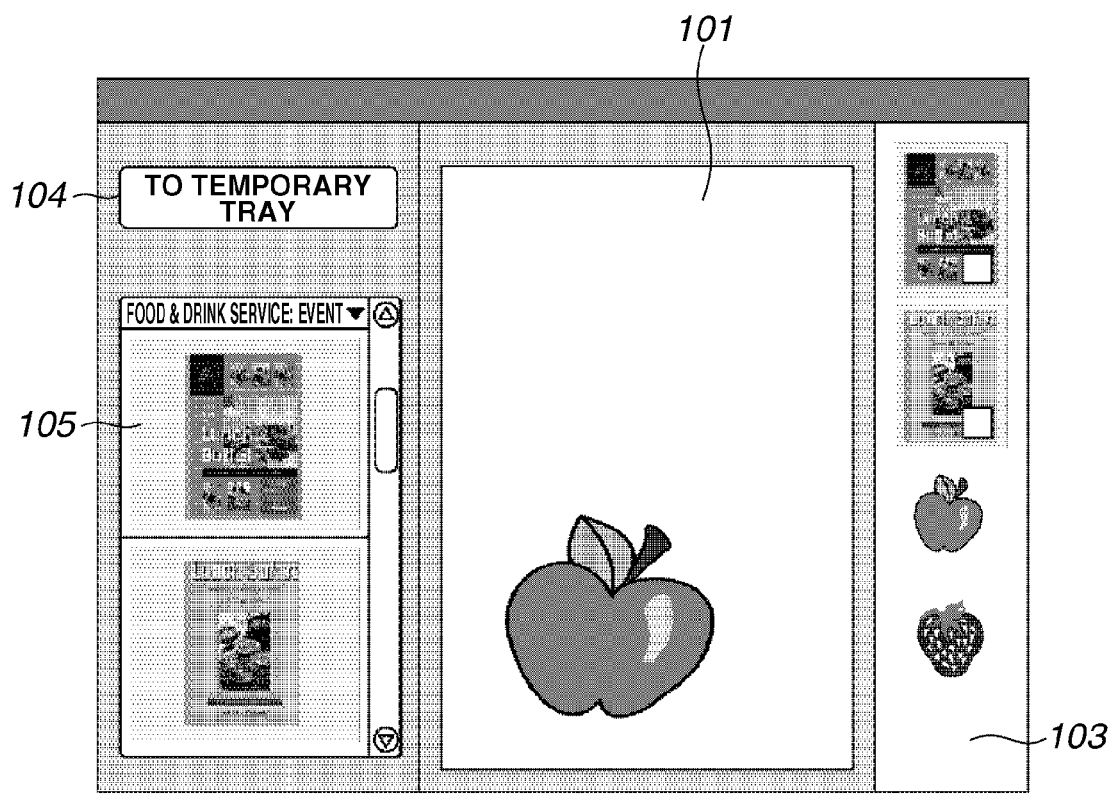
FIG. 7 illustrates an exemplary state of the editing screen that displays the document "A" being edited.
Figure 8:
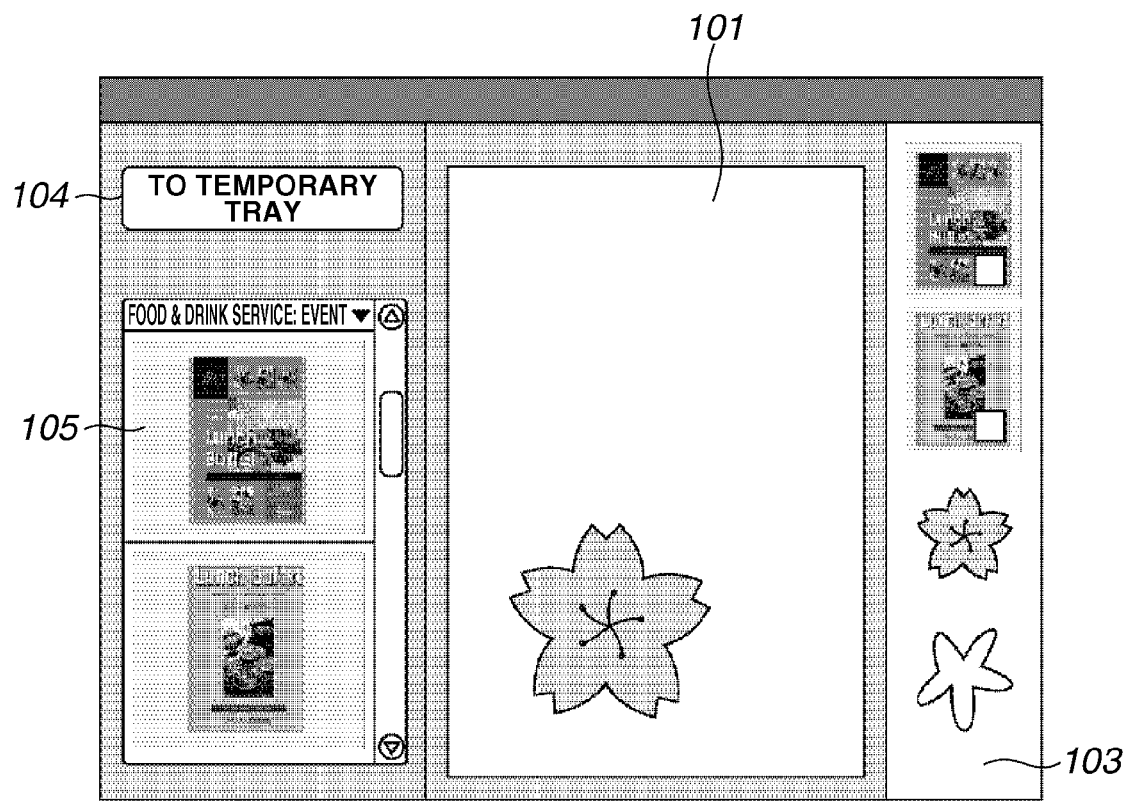
FIG. 8 illustrates an exemplary state of the editing screen that displays the document "B" being edited.

FIG. 5 illustrates an exemplary state of the memory in an editing operation of the document "A." FIG. 6 illustrates an exemplary state of the memory in an editing operation of the document "B." FIG. 7 illustrates an exemplary state of the editing screen that displays the document "A" being edited. FIG. 8 illustrates an exemplary state of the editing screen that displays the document "B" being edited.

In the state of FIG. 5, the memory stores information relating to an image 1023 and an image 1026 as temporary storage materials registered for the document "A." When the document "A" of the memory is transferred to the file 206 of the external memory, the memory can simultaneously transfer the material file path information 202 of these images 1023 and 1026 to the file 206 in relation to the document "A" as illustrated in FIG. 4.

In the state of FIG. 6, the memory stores information relating to an image 2268 and an image 2269 as temporary storage materials registered for the document "B" to be generated. The memory also stores information relating to a template 118 and a template 121 as temporary storage templates being registered.

If the document "A" already stored in the file 206 is opened in this state, the processing according to an exemplary embodiment includes reading the material file path information in the document file 206 illustrated in FIG. 4 and writing the read information into the material file path information in the storage area 202 of the memory.

Through the above-described processing, the editing state of the document "B" illustrated in FIG. 6 can be changed to the editing state of the document "A" illustrated in FIG. 5.

More specifically, the temporary storage template group can be maintained without any change, while the temporary storage material group can be changed from the display state for the document "B" to a display of material images related to the document "A." In this case, on the editing screen, the editing state of the document "B" illustrated in FIG. 8 can be changed to the editing state of the document "A" illustrated in FIG. 7.

Second Exemplary Embodiment

Figure 9:
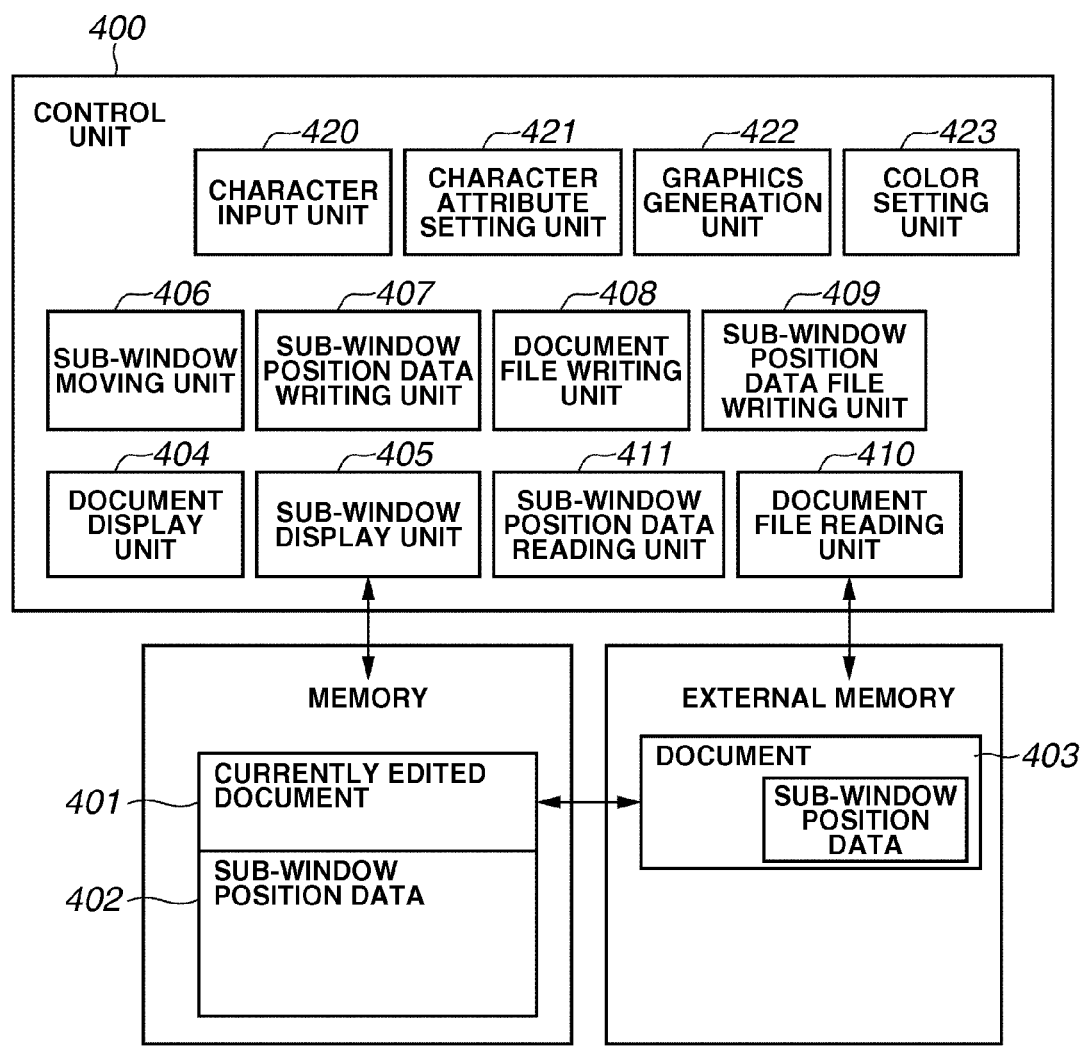
FIG. 9 is a block diagram illustrating a layout editing apparatus according to a second exemplary embodiment of the present invention.

FIG. 9 is a block diagram illustrating a layout editing apparatus according to a second exemplary embodiment of the present invention. A memory includes a storage area 401 that stores a document being currently edited and a storage area 402 that stores sub-window position data. An external memory stores a document file 403.

A control unit 400 illustrated in FIG. 9 includes a document display unit 404, a sub-window display unit 405, a sub-window moving unit 406, a sub-window position data writing unit 407, a document file writing unit 408, a sub-window position data file writing unit 409, a document file reading unit 410, a sub-window position data reading unit 411, a character input unit 420, a character attribute setting unit 421, a graphics generation unit 422, and a color setting unit 423.

Figure 10:
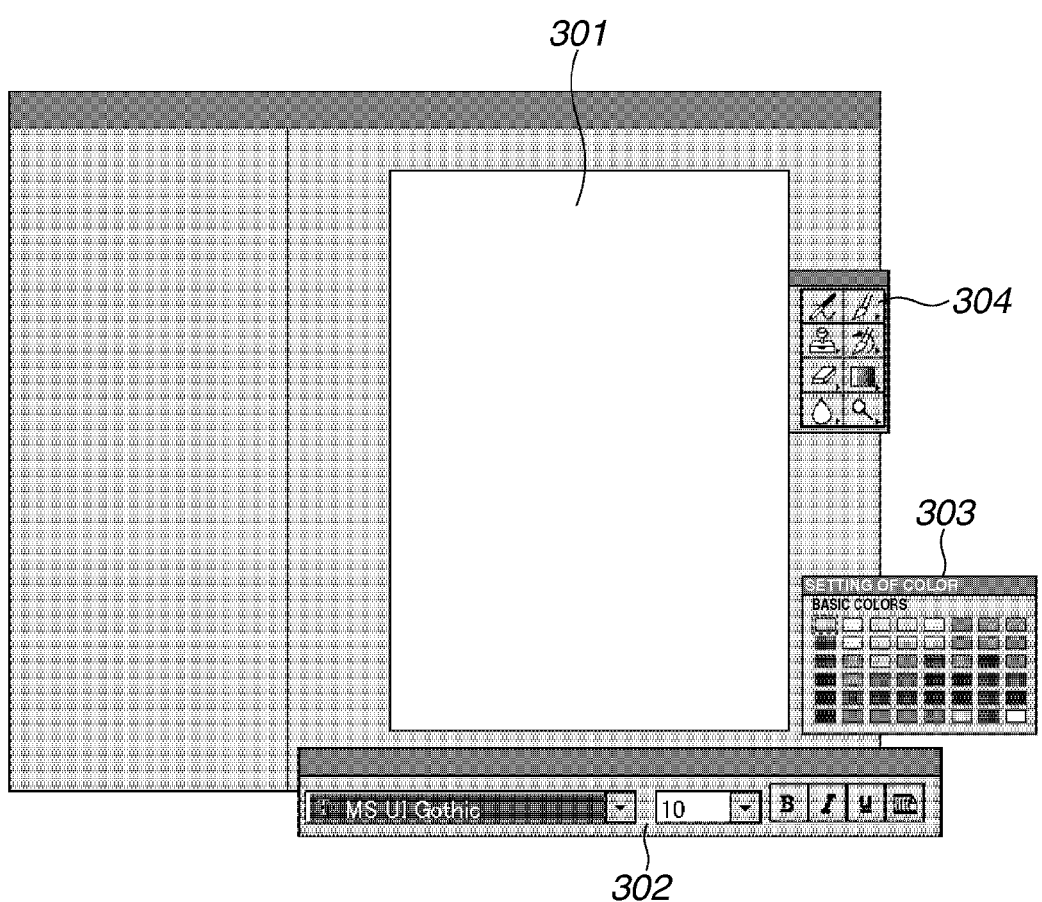
FIG. 10 illustrates an exemplary state of the editing screen that displays a newly generated page of a document.

FIG. 10 illustrates an exemplary state of the editing screen that displays a new page of a document generated by a layout editing apparatus configured to determine a layout of images and characters disposed on the page. When a user generates a new document page, the layout editing apparatus displays a sub-window (i.e., a display area different from a document editing area) on the editing screen. The sub-window can display a group of editing functions belonging to the same category.

The editing screen illustrated in FIG. 10 includes a document editing window 301, a sub-window 302 that displays a group of character attribute setting functions, a sub-window 303 that displays a group of color setting functions, and a sub-window 304 that displays a group of other functions.

A user can move the character attribute setting sub-window 302 toward an upper part of the page from the state of the new document illustrated in FIG. 10, so that the user can easily change the attribute of characters being currently input.

Figure 11:
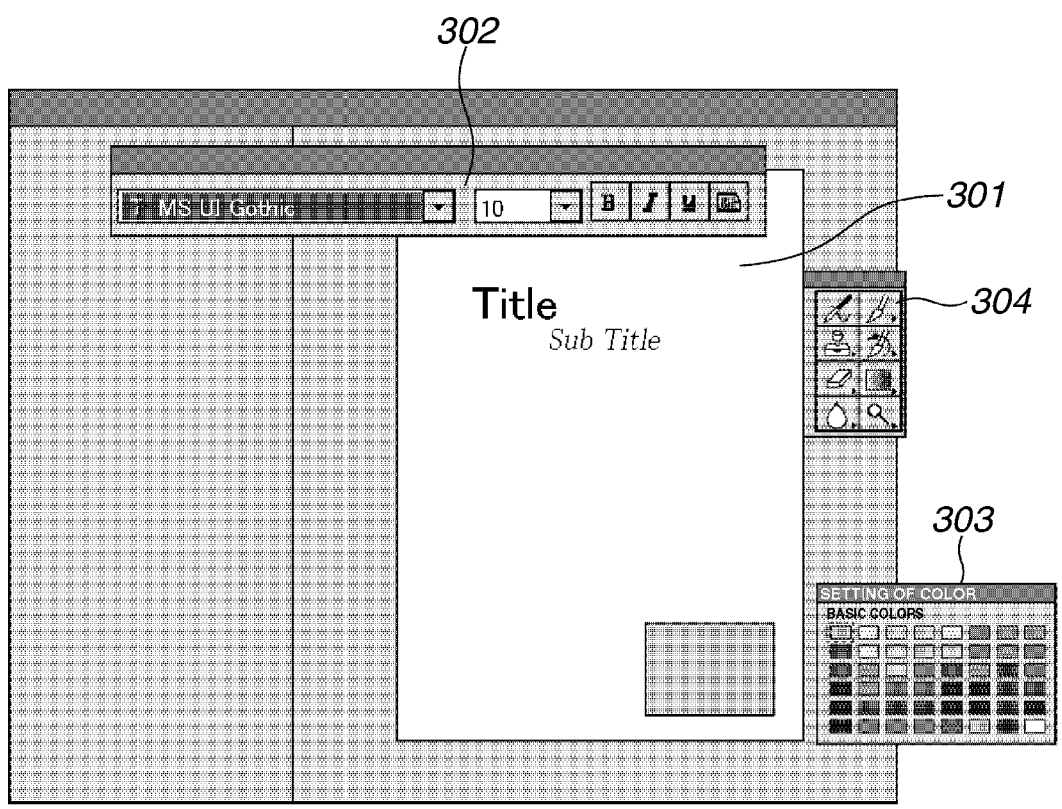
FIG. 11 illustrates an exemplary state of the editing screen that displays a character attribute setting sub-window positioned at an upper part of the page.

FIG. 11 illustrates an exemplary state of the editing screen that displays the character attribute setting sub-window 302 having been moved to an upper part of the page, as described above.

An exemplary flow of the processing for changing the editing state of FIG. 10 to the editing state of FIG. 11 is described below.

The document display unit 404 illustrated in FIG. 9 displays the window 301. The sub-window display unit 405 displays the sub-windows 302, 303, and 304.

In this case, the sub-window position data writing unit 407 writes initial values of sub-window position data into the storage area 402 of the memory.

Figure 12:
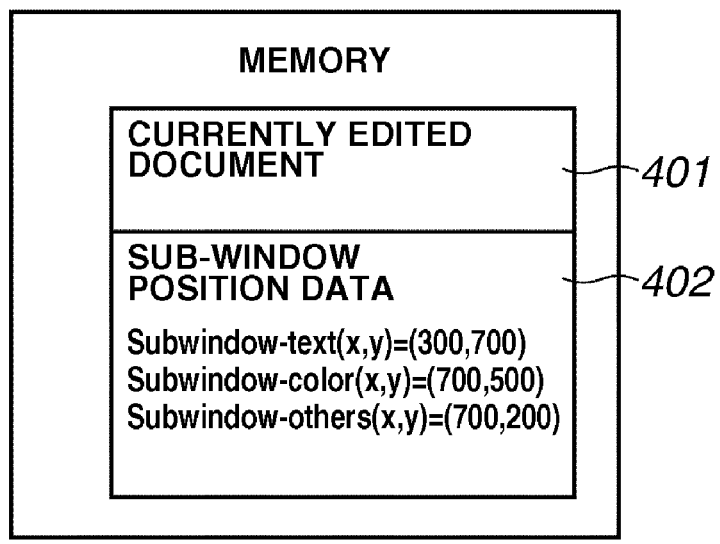
FIG. 12 illustrates an exemplary state of the memory when a new document page is generated as illustrated in FIG. 10.

FIG. 12 illustrates an exemplary state of the memory at this moment, i.e., the state of the memory when a new document is generated as illustrated in FIG. 10.

In FIG. 12, the sub-window position data is (x, y)=(300, 700), (700,500), and (700,200) which indicate the upper-left corners of respective sub-windows 302, 303, and 304 illustrated in FIG. 10.

Furthermore, when the character input unit 420 inputs characters to an upper part of the page according to an operation of a user, the sub-window moving unit 406 moves the character attribute setting sub-window 302 near the input characters on the page.

Figure 13:
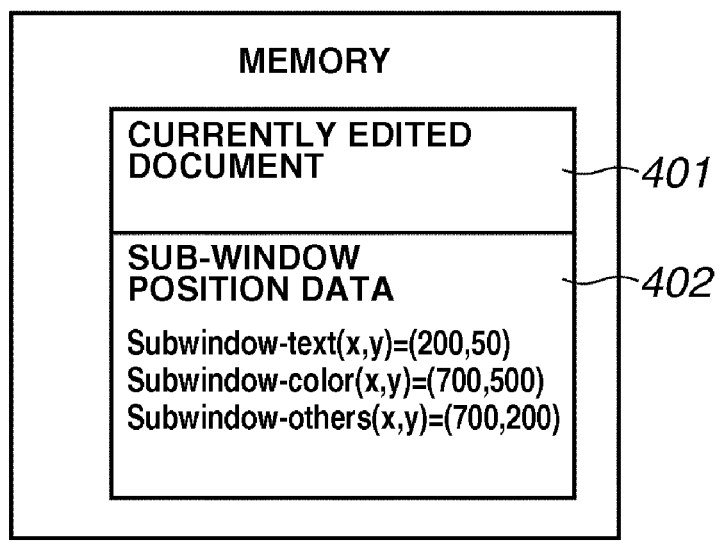
FIG. 13 illustrates an exemplary state of the memory when the document page is edited as illustrated in FIG. 11.

FIG. 13 illustrates an exemplary state of the memory at this moment, i.e., the state of the memory when the document is edited as illustrated in FIG. 11.

In FIG. 13, the sub-window position data is (x, y)=(200, 50), (700,500), and (700,200) which indicate the upper-left corners of respective sub-windows 302, 303, and 304 illustrated in FIG. 11.

Next, the document file writing unit 408 transfers a currently edited document from the memory to the file 206 of the external memory. Furthermore, the sub-window position data file writing unit 409 transfers the sub-window position data from the memory to the file 206 of the external memory.

The file 206 stored in this manner is hereinafter referred to as document "C."

Figure 14:
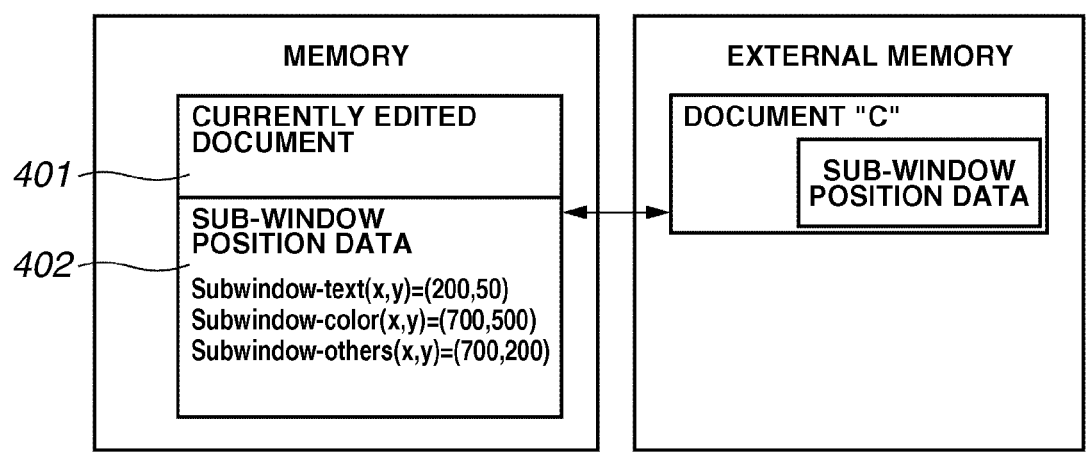
FIG. 14 illustrates an exemplary state of an external memory that stores a document "C."

FIG. 14 illustrates an exemplary state of the external memory that stores the document "C."

A user may input graphics to the upper part of a new document page and also may move a color setting sub-window 303 toward the input graphics to perform color change processing.

Figure 15:
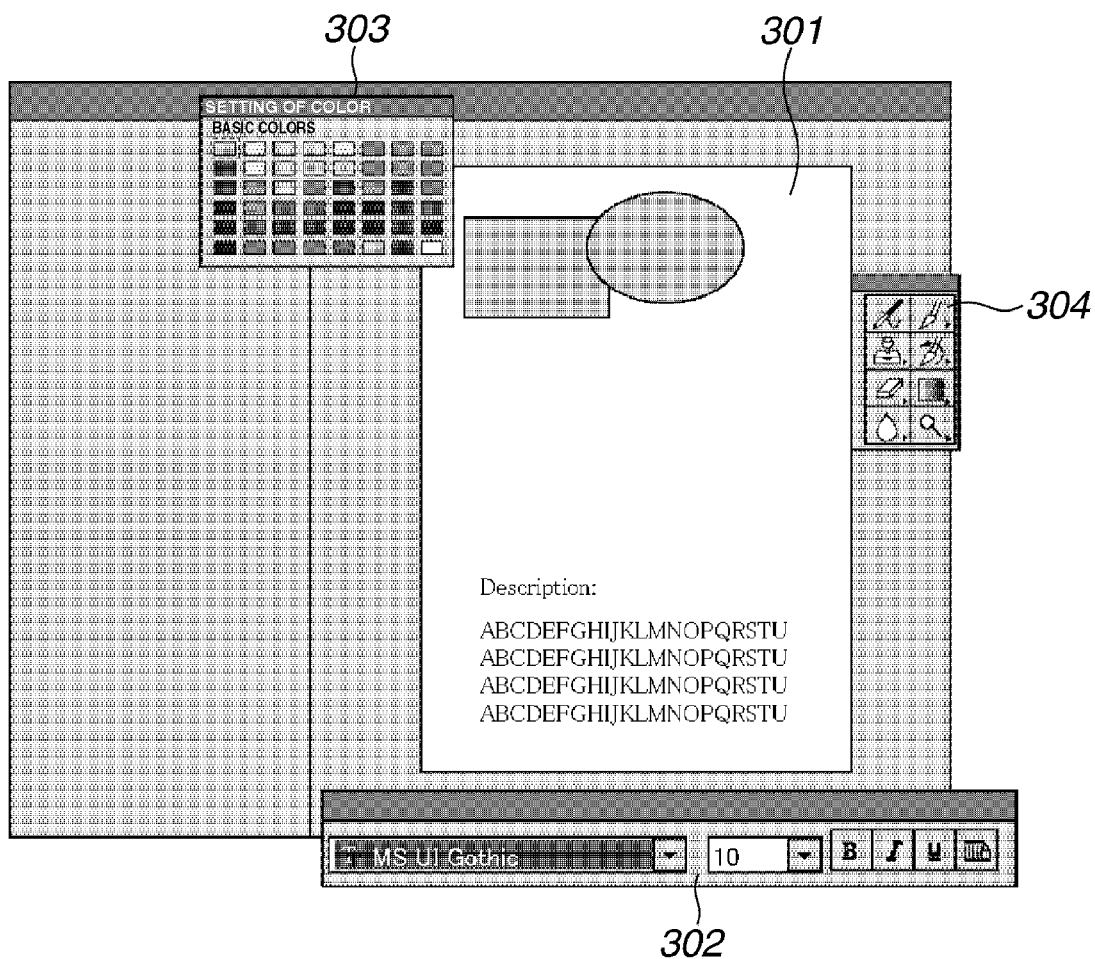
FIG. 15 illustrates an exemplary state of the editing screen that displays a color setting sub-window positioned at an upper part of the page.

FIG. 15 illustrates an exemplary state of the editing screen that displays the color setting sub-window 303 having been moved to the upper part of the page, as described above.

An exemplary flow of the processing for changing the editing state of FIG. 10 to the editing state of FIG. 15 is similar to the flow of the processing for changing the editing state of the FIG. 10 to the editing state of FIG. 11.

Figure 16:
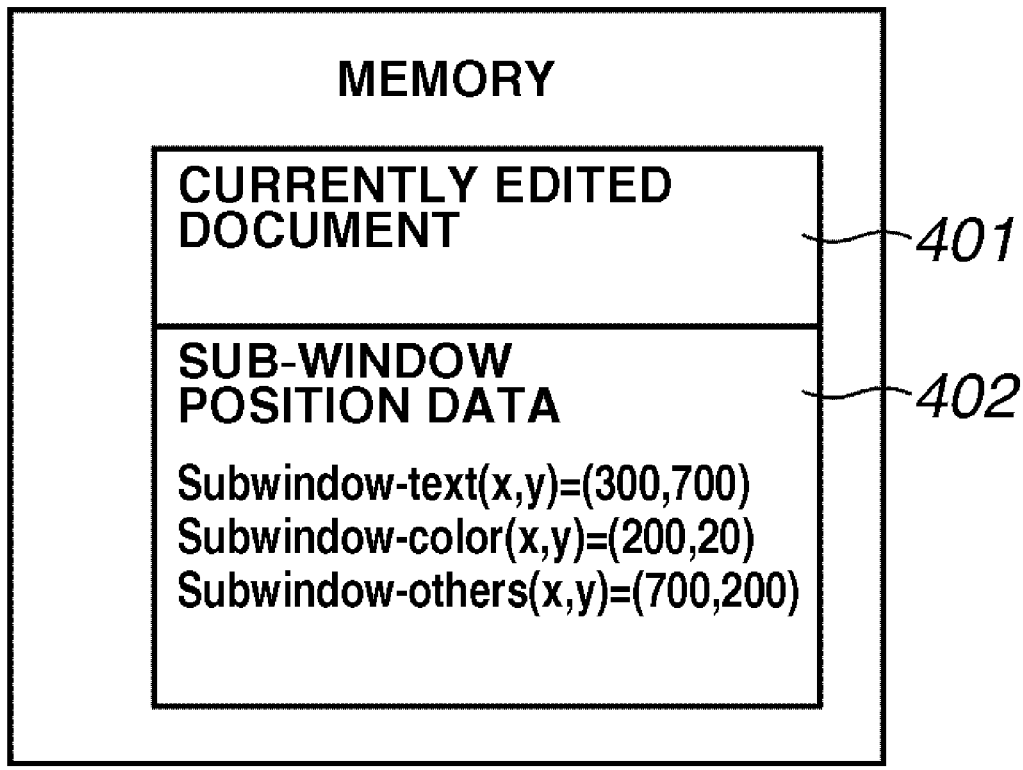
FIG. 16 illustrates an exemplary state of the memory when the document page is edited as illustrated in FIG. 15.

FIG. 16 illustrates an exemplary state of the memory when the document is edited as illustrated in FIG. 15.

In FIG. 16, the sub-window position data is (x, y)=(300, 700), (200,20), and (700,200) which indicate the upper-left corners of respective sub-windows 302, 303, and 304 illustrated in FIG. 15.

The document file reading unit 410 reads the document "C" and rewrites the currently edited document so as to include the contents of the document "C."

Furthermore, the sub-window position data reading unit 411 reads sub-window position data written in the document "C" file and updates the sub-window position data in the storage area 402 of the memory.

As a result, the state of the memory can be changed from the state of FIG. 16 to the state of FIG. 13. The sub-window display unit 405 displays the sub-window on the editing screen based on the updated sub-window position data stored in the memory.

The above-described processing can restore the editing screen to the state illustrated in FIG. 11 where respective sub-windows 302, 303, and 304 are displayed at the previous positions memorized when the document "C" is stored.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-330690 filed Dec. 7, 2006, which is hereby incorporated by reference herein in its entirety.

What is claimed is:

1. A method, comprising:

displaying a screen including an editing area for editing documents;

displaying, during displaying the screen including the editing area and editing of a first document in the editing area by a user, a temporary storage area that temporarily displays a first list of one or more editing materials, wherein each editing material of the first list of one or more editing materials displayed in the temporary storage area was selected during the editing of the first document by the user from prepared materials and is configured to be added to the first document;

storing, using a memory and in relation to each other as a document file, the edited first document and first path information of the one or more editing materials displayed in the temporary storage area, wherein the edited first document and the first path information are one document file of a plurality of document files stored in the memory, wherein each of the document files contains, in relation to each other, an edited document and path information of one or more editing materials selected by a user from prepared materials that were displayed during the editing of the edited document;

determining, in response to opening a newly opened document, whether path information of one or more editing materials is stored in the memory in a document file in relation to the newly opened document; and displaying the newly opened document in the editing area and, in response to determining that the path information of one or more editing materials is stored in relation to the newly opened document, displaying in the temporary storage area a list of one or more editing materials based on the path information of one or more editing materials stored in relation to the newly opened document.

2. The method according to claim 1, wherein, in response to displaying a second document in the editing area, the temporary storage area displays a second list of one or more editing materials, wherein each editing material of the second list of one or more editing materials is a reduced image of an editing material whose layout cannot be edited, and further displays the first document and the second document as reduced images of documents whose layout can be edited when displayed in the editing area, the method further comprises:

replacing, in response to the reduced image first document being selected from the temporary storage area by the user, the second list of one or more editing materials in the temporary storage area with the first list of one or more editing materials and maintaining the display of the first document and the second document as reduced images in the temporary storage area.

3. The method according to claim 2, further comprising:
displaying a mark on at least one reduced image in the temporary storage area, wherein the mark discriminates the reduced image of the editing material displayed in the temporary storage area from the reduced image of the second document displayed in the temporary storage area.

4. The method according to claim 2, further comprising:
memorizing, as a memorized position, a display position of a sub-window on the screen in relation to the edited first document in response to the edited first document being stored, wherein the sub-window displays materials used for editing a document or enables the user to input an instruction;

displaying the sub-window in a default display position in response to the second document being displayed in the editing area; and adjusting, in response to the reduced image first document being selected from the temporary storage area by the user, the display position of the sub-window to the memorized position on the screen.

5. The method according to claim 2, further comprising:
moving, in response to receiving at a first location characters input into the second document, a display position of a sub-window on the screen to a position that is adjacent to the input characters at the first location on the second document.

6. The method according to claim 1, wherein the one or more editing materials displayed during the displaying of the newly opened document are separated according to category.

* * * * *